United States Patent
Kanada et al.

[11] Patent Number: 6,155,755
[45] Date of Patent: Dec. 5, 2000

[54] HARD SINTERED BODY TOOL

[75] Inventors: Yasuyuki Kanada; Kunihiro Tomita; Tetsuo Nakai, all of Itami, Japan

[73] Assignee: Sumitomo Electric Industries, Ltd., Osaka, Japan

[21] Appl. No.: 09/258,400

[22] Filed: Feb. 26, 1999

[30] Foreign Application Priority Data

| Mar. 2, 1998 | [JP] | Japan | 10-049284 |
| May 14, 1998 | [JP] | Japan | 10-131509 |
| Aug. 5, 1998 | [JP] | Japan | 10-221778 |
| Jan. 7, 1999 | [JP] | Japan | 11-002043 |

[51] Int. Cl.[7] ............... B26D 3/00; B23B 27/14
[52] U.S. Cl. ............... 407/118; 407/119; 428/698
[58] Field of Search .......... 407/118, 119; 82/1–11; 428/386, 698, 699; 408/144, 145; 51/295

[56] References Cited

U.S. PATENT DOCUMENTS

| 3,548,473 | 12/1970 | Stein | 407/18 X |
| 3,660,877 | 5/1972 | Stein | 407/18 X |
| 4,117,968 | 10/1978 | Naidich et al. | |
| 5,366,522 | 11/1994 | Nakamura et al. | 51/293 |

FOREIGN PATENT DOCUMENTS

| 0 350 735 | 1/1990 | European Pat. Off. | |
| 0 456 481 | 11/1991 | European Pat. Off. | |
| 2446690 | 5/1943 | France | 407/118 |
| 2 693 139 | 1/1994 | France | |
| 750530 | 5/1943 | Germany | 407/118 |
| 10 29 945 | 5/1958 | Germany | |
| 37 36 564 | 5/1989 | Germany | |
| 43 04 104 | 9/1993 | Germany | |
| 0048405 | 3/1982 | Japan | 407/119 |
| 59-128279 | 7/1984 | Japan | |
| 59-134665 | 8/1984 | Japan | |
| 60-85940 | 5/1985 | Japan | |
| 60-187603 | 9/1985 | Japan | |
| 64-4839 | 2/1989 | Japan | |
| 2-274405 | 11/1990 | Japan | |
| 3-17791 | 3/1991 | Japan | |
| 4-36803 | 6/1992 | Japan | |
| 7-124804 | 5/1995 | Japan | |
| 62-24903 | 2/1997 | Japan | |
| 9-103901 | 4/1997 | Japan | |
| 9-108912 | 4/1997 | Japan | |

OTHER PUBLICATIONS

"Investigation of contact phenomena at cubic boron nitride—filler metal interface during electron beam brazing", I.L. Pobol et al., Diamond and Related Materials, vol. 6, No. 8, May 1, 1997, pp. 1067–1070.

Primary Examiner—Henry W. H. Tsa
Attorney, Agent, or Firm—McDermott, Will & Emery

[57] ABSTRACT

A tool manufactured by brazing a hard sintered body such as a diamond or cBN to a tool substrate through a bonding layer comprising at least one of Ti and Zr by 15–65 wt % and Cu. Two ridges of the tool substrate on both sides each has a first ridge adjacent to and aligned with a ridge of the hard sintered body and a second ridge provided nearer to an inscribed circle of the tool than is the ridge of the hard sintered body. Also, an upright side face and a bottom of each seating groove formed in the tool substrate intersect each other at an angle smaller than the intersecting angle between a back side and a bottom of each hard sintered body.

16 Claims, 10 Drawing Sheets

HARD SINTERED BODY TOOL

BACKGROUND OF THE INVENTION

This invention relates to a cutting, drilling or wear-resistant tool comprising a tool substrate and a hard sintered body of diamond or cubic boron nitride bonded to the tool substrate with high strength and rigidity, and a method of manufacturing the same.

Sintered diamond manufactured by sintering fine diamond particles using a binder such as an iron-family metal in ultra-high-pressure, high-temperature environments, has far higher wear resistance than conventional cemented carbides, and is thus widely used as a material for cutting edges of cutting tools, wire-drawing dies, drill bits and wear-resistant tools. A sintered material made by sintering fine cubic boron nitride particles using various binders shows excellent performance when used for cutting hard iron-family metals and cast iron.

Figure 5:
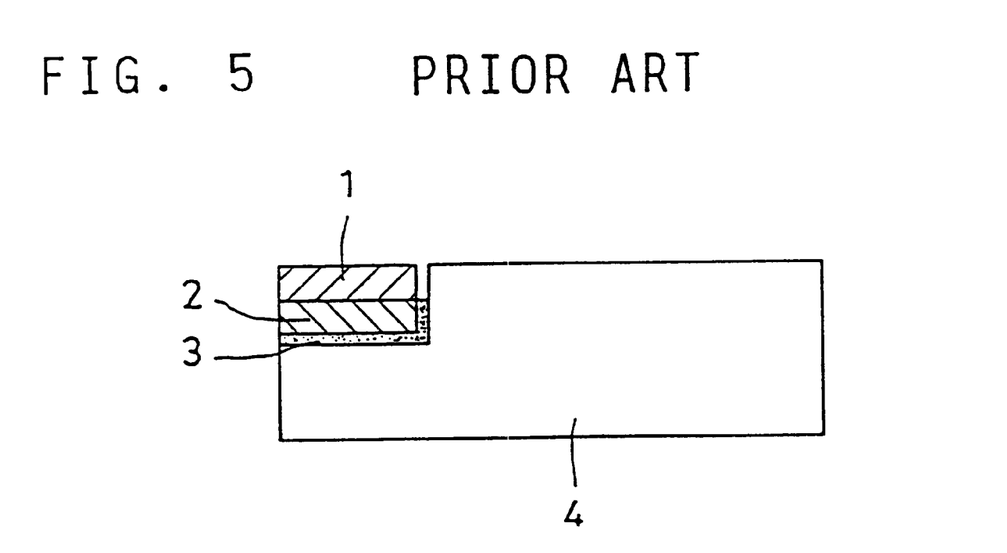
FIG. 5 is a sectional view of a conventional cutting tool of hard sintered body.

FIG. 5 shows a conventional cutting tool having a hard sintered body bonded. A hard sintered body 1 is manufactured as a composite sintered body of diamond or cubic boron nitride lined with a support 2 of cemented carbide. This hard sintered body has its side of the support 2 brazed to a tool substrate 4 through a bonding layer 3 mainly of Ag or Cu to form a cutting tool as shown in FIG. 5.

During brazing, these composite sintered bodies are subjected to quick heating and cooling. Thus, according to conditions, cracks and breakage may occur at the bond interface between the hard sintered body 1 and the support 2 of cemented carbide due to a difference in thermal expansion between these materials. Further, even after the cutting tool has been completed, according to the sintering conditions of the hard sintered body, due to low bond strength at the interface, under severe cutting conditions, peeling or chipping may occur during cutting. Thus, there was a problem in reliability of the tool.

In order to overcome these problems, unexamined Japanese patent publication 60-85940 proposes to improve the reliability at the interface by forming a carbide or nitride of Ti or Zr at the interface between the sintered body and the support of cemented carbide. But since the composite sintered bodies are formed by bonding different materials that are different in thermal expansion, the effect of improvement was limited.

On the other hand, it has been contemplated to bond the hard sintered body 1 (of diamond or cubic boron nitride) to the tool substrate 4 not through the support 2 cemented carbide but directly to eliminate the bond interface between the hard sintered body 1 and the support 2 of cemented carbide. Such tool structures are disclosed in unexamined Japanese patent publications 59-134665 and 60-187603, examined Japanese utility model publication 64-4839,1 unexamined Japanese patent publication 2-274405, examined Japanese patent publication 3-17791, and unexamined Japanese patent publications 7-124804 and 9-108912. These prior art publications disclose that an active metal layer is formed on the surface of a diamond sintered body or a cubic boron nitride sintered body, and it is bonded directly to a tool substrate by a brazing filler made mainly of Ag or Cu, or using an active brazing filler comprising a soft metal such as Ag, Cu or Au and an active metal such as Ti, zr or Ta, such as Ag—Cu—Ti, Cu—Ti, Ag—Ti, Au—Ta or Au—Nb.

In these prior arts, since a sintered body of diamond or cubic boron nitride is bonded to a tool substrate through a bonding layer made mainly of a soft metal such as Ag, under severe cutting conditions, there were various problems such as lowering of the cutting accuracy or worsening of the surface roughness due to deformation of the bonding layer, chattering due to lack of rigidity, and erosion of the brazing material and breakage of the tool due to the fact that cutting heat produced at the tool cutting edge flows directly into the bonding layer through the sintered body which has a high thermal conductivity.

An object of the present invention is to provide a hard sintered body tool in which a hard sintered body of diamond or cubic boron nitride is bonded to a tool substrate through a bonding layer with high strength and rigidity such that the hard sintered body will not break or crack.

An object of this invention is to prevent cracks and breakage of the hard sintered body when brazed while achieving high bond strength between the sintered body and the tool body.

SUMMARY OF THE INVENTION

According to the present invention, there is provided a hard sintered body tool comprising a hard sintered body containing not less than 20 vol. % of diamond or cubic boron nitride and bonded to a tool substrate through a bonding layer containing Ti and/or Zr by 15–65 wt % and copper.

In a preferred embodiment of this invention, said bonding layer contains both Ti and Zr each by 20–30 wt %, and Cu.

In a still more preferable embodiment of this invention, said bonding layer further contains 10–30 wt % of Ni.

The bonding layer preferably has a melting point of 700–1000° C.

The hard sintered body may be bonded through the bonding layer directly to the tool substrate.

The hard sintered body is preferably 0.25–1.5 mm thick.

The hard sintered body tool of the present invention has a polygonal tool substrate and a hard sintered body bonded to a corner of the tool substrate, two ridges of the tool substrate on both sides of the corner each comprising a first ridge adjacent to and aligned with a ridge of the hard sintered body and a second ridge provided nearer to the inscribed circle of the tool than is the ridge of the hard sintered body.

A hard sintered body tool having the first ridge which is 0.1–2.0 mm long, and a hard sintered body tool in which the first and second ridges are connected together by a step of 0.01–1 mm are preferable.

A hard sintered body tool is preferable which is formed with seating grooves at corners, the hard sintered body brazed to one of the seating grooves, the hard sintered body having a ridge as a cutting edge, each of the seating grooves having an upright side face and a bottom intersecting each other at an angle smaller than the intersecting angle of the bottom and the back side of the hard sintered body.

The intersecting angle of the upright side face and the bottom of the seating grooves should preferably be between 75° and 87°.

The upright side and the bottom of each of the seating grooves should preferably be connected together by a curved surface having a radius of curvature of 0.1–0.3 mm.

The tool substrate may be made of a cemented carbide.

According to the present invention, the hard sintered body is brazed to a tool substrate through a brazing filler as a bonding layer in vacuum or in an inert gas atmosphere.

Also, the hard sintered body nitride should be brazed to a tool substrate using a brazing filler containing Ag, In, Li, Mn, Zn, Cu, Ti and Zr in a high vacuum to form a bonding layer consisting essentially of Cu, Ti and Zr to bond the hard sintered body to the tool substrate through the bonding layer.

Also, the hard sintered body may be brazed to a tool substrate using a brazing filler containing Ag, In, Li, Mn, Zn, Cu, Ti, Zr and Ni in a high vacuum to form a bonding layer consisting essentially of Cu, Ti, Zr and Ni to bond the hard sintered body to the tool substrate through the bonding layer.

Also, according to the present invention, there is also provided a method of manufacturing a hard sintered body tool in which a hard sintered body is bonded to a corner of a polygonal tool substrate through a bonding layer, the method comprising the steps of providing each of two ridges of the tool substrate on both sides of the corner with a first ridge adjacent the hard sintered body, and a second ridge provided nearer to an inscribing circle of the tool than is the first ridge, bonding the hard sintered body to the corner of the tool substrate, and simultaneously grinding the ridges of the hard sintered body and the first ridges to form cutting edges on the hard sintered body.

Other features and objects of the present invention will become apparent from the following description made with reference to the accompanying drawings, in which:

DETAILED DESCRIPTION OF THE PREFERRED EMBODIMENT

We, the inventors, ardently tried to develop a method of bonding a sintered body of diamond or cubic boron nitride to a tool substrate through a bonding layer with high strength and high rigidity without causing the sintered body to get broken or cracked.

As a result, we have found out that a diamond sintered body or a hard sintered body of cubic boron nitride can be bonded securely to a tool substrate without causing breakage or cracks by using a brazing material containing 15–65 wt % Ti and/or Zr, and Cu.

For a material which can be a main component of the brazing material, the following two properties are required: the bonding layer is less likely to be deformed even under high cutting force, and it can absorb strains due to a difference in thermal expansion when the sintered body of diamond or cubic boron nitride is bonded to the tool substrate.

Conventional brazing materials used for this purpose contain silver (Ag) as a main component. But Ag is so low in elastic modulus that the bonding layer tends to be deformed markedly in applications in which cutting force is high. Thus, Ag is not suitable as a component for a brazing material. In contrast, copper (Cu) is high in elastic modulus and thus can absorb strains due to difference in thermal expansion. Thus, we have found out that it is important that the brazing material contain Cu.

On the other hand, the bonding portion is subjected to high temperature due to cutting heat as well as high cutting force during cutting. Thus, in order to improve the reliability at the bonding portion, besides high bond strength at normal temperature, high heat resistance is needed to keep the strength high even at high temperatures. Metals belonging to groups IVa, Va, VIa in the periodic table are higher in strength than Ag and Cu and also superior in high-temperature strength and resistance to deformation.

We have found out that it is possible to obtain a brazing material with improved bond strength and high-temperature strength by adding such a metal in these groups to copper as a main component. Among the abovementioned metals, Ti and Zr are especially high in high-temperature strength and activity. Thus, by adding Ti and/or Zr to Cu, wettability to the brazing material improves, thus greatly improving the bond strength between the sintered body of diamond or cubic boron nitride and the tool substrate.

If the content of Ti and/or zr in the brazing material is less than 15 wt %, the bond strength and high-temperature strength will not improve. If over 65 wt %, the melting temperature tends to rise, thus increasing the possibility of causing chipping due to strain during bonding. The preferable content of Ti and/or Zr in the brazing material is thus between 15 and 60 wt %.

If the Ti and Zr contents in the brazing material are both 20–30 wt %, the melting point will drop markedly due to the effect of the ternary eutectic crystal Ti—Zr—Cu. This is preferable because bonding is possible at a lower melting point.

If a brazing material contains, besides the above-described elements, 10–30 wt % Ni, heat resistance and corrosion resistance will improve. If the Ni content is less than 10%, no improvement in high-temperature strength due to the addition of Ni will appear. If over 30 wt %, the melting point will increase, thus increasing the possibility of cracks or strains of the sintered body during bonding. The Ni content in the brazing filler is thus preferably between 10 and 30 wt %.

By using a brazing filler having such a composition as described above, brazing can be carried out at a relatively low temperature, i.e. 800–1000° C.

The hard sintered body bonded to the tool substrate may be a well-known hard sintered body containing diamond or cubic boron nitride by 20 vol. % or more and supported by a cemented carbide support. But since this composite is subjected to rapid heating and cooling during heat bonding, it may suffer cracks or chipping at the bond interface between the hard sintered body and the tool substrate due to a difference in thermal expansion between the two materials according to conditions. Thus, in order to obtain a more reliable tool of hard sintered body, it is preferable to directly bond a hard sintered body having no support to the tool substrate through the bonding layer.

Even if a high-bond-strength brazing filler as described above is used, cutting heat produced at the tip of the tool cutting edge will flow in a large amount into the bonding layer through the highly heat-conductive diamond or cubic boron nitride sintered body if the sintered body is thinner than 0.25 mm, thus raising the temperature at the bonding layer and causing its deformation or chipping. Thus, it was found out that the diamond or cubic boron nitride sintered body has to have a thickness of at least 0.25 mm. If the thickness is more than 1.5 mm, grinding the cutting edge is troublesome. Thus, it was found out that from an economical viewpoint, the thickness of the sintered body is preferably 1.5 mm or less.

The tool substrate to which the hard sintered body is bonded may be made of any material so long as it is strong enough to withstand the cutting force, such as cemented carbide, steel or ceramics. Taking the material strength and the difference in thermal expansion coefficient between the substrate and the hard sintered body to be bonded thereto into consideration, cemented carbide is the most preferable.

Next, in order to bond the hard sintered body to the tool substrate through the bonding layer having the above composition, it is necessary to heat and bond in a vacuum of $1 \times 10^{-3}$ to $1 \times 10^{-6}$ torr or an inert gas atmosphere such as Ar using a brazing filler containing 15–65 wt % Ti and/or Zr, and Cu, a brazing filler containing Ti and Zr each by 20–30 wt %, the balance being Cu, or a brazing filler further containing 10–30 wt % Ni, because during bonding/heating, it is necessary to prevent oxidation of the components of the brazing filler, particularly Ti and Zr. For this purpose, it is essential to heat and bond in the above-defined vacuum or inert gas atmosphere because in such an atmosphere, residual oxygen concentration is low.

Also, in a method in which heat bonding is carried our in a high vacuum of about $1 \times 10^{-4}$ to $1 \times 10^{-6}$ torr using a brazing filler containing Ag, In, Li, Mn, Zn, Cu, Ti and Zr with Ni added optionally, it is possible to form a bonding layer essentially consisting of Cu, Ti, zr, or a bonding layer essentially consisting of Cu, Ti, Zr, Ni by vaporizing Ag, In, Li, Mn, and Zn. In this case, heat bonding can be carried out at a low temperature of about 700° C. . This lessens problems resulting from thermal expansion differences. Bonding layers formed by this method should also contain 15–65 wt % Ti and/or Zr, and Cu, or contain Ti and Zr each by 20–30 wt %, the balance being Cu, or may further contain 10–30 wt % Ni.

Even if the hard sintered body is bonded to the tool substrate in the method described above, a crack or chipping may develop in the hard sintered body according to conditions.

Figure 10:
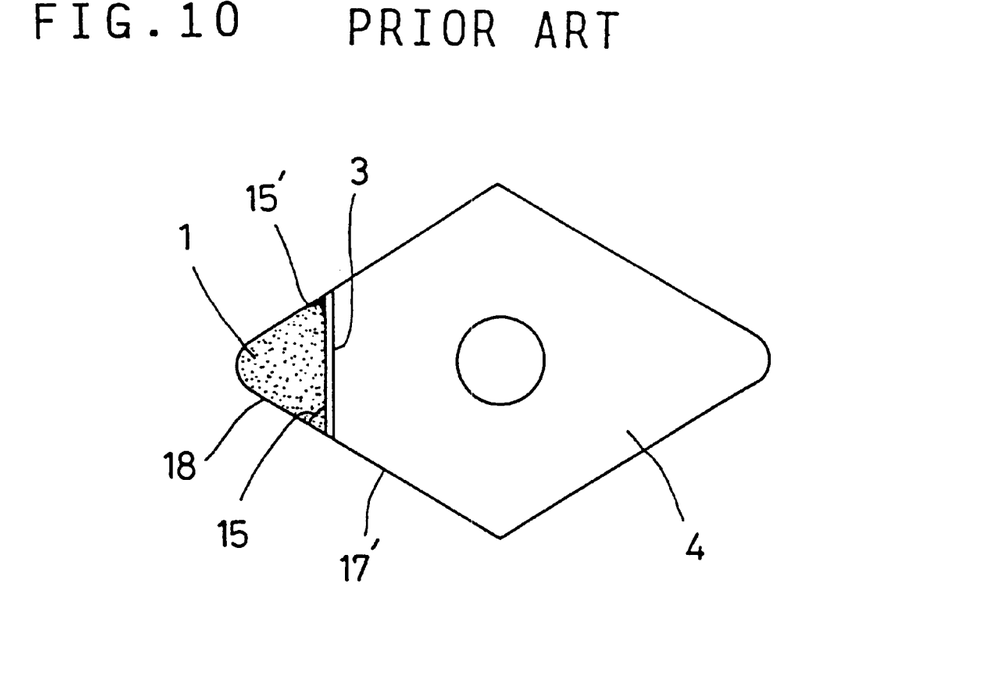
FIG. 10 is a front view of a conventional insert.
Figure 11:
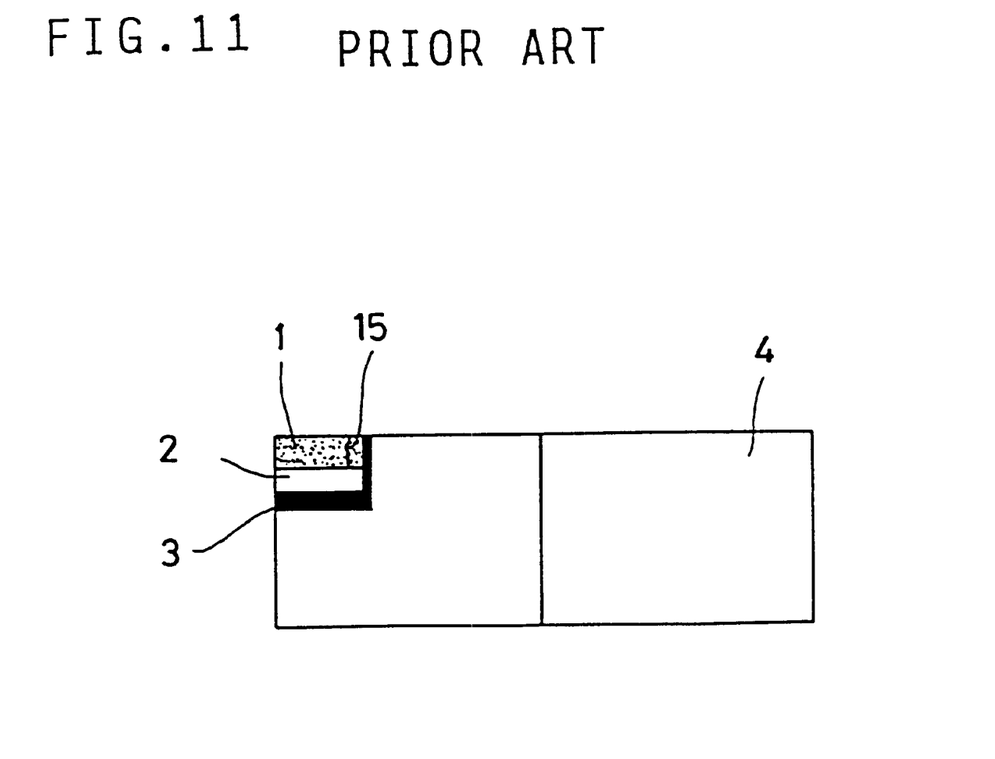
FIG. 11 is a side view of the same.

As shown in FIGS. 10 and 11, at the bond portion between a ridge 18 of the hard sintered body 1 and a ridge 17' of a tool substrate 4, the hard sintered body forms an acute angle. Thus, cracks and chippings tend to develop during the grinding for forming a cutting edge.

Such a crack or breakage serves as a starting point of major breakage, thus lowering the bond strength and increasing the possibility of dropout of the hard sintered body during use. The tool life thus shortens.

Figure 12:
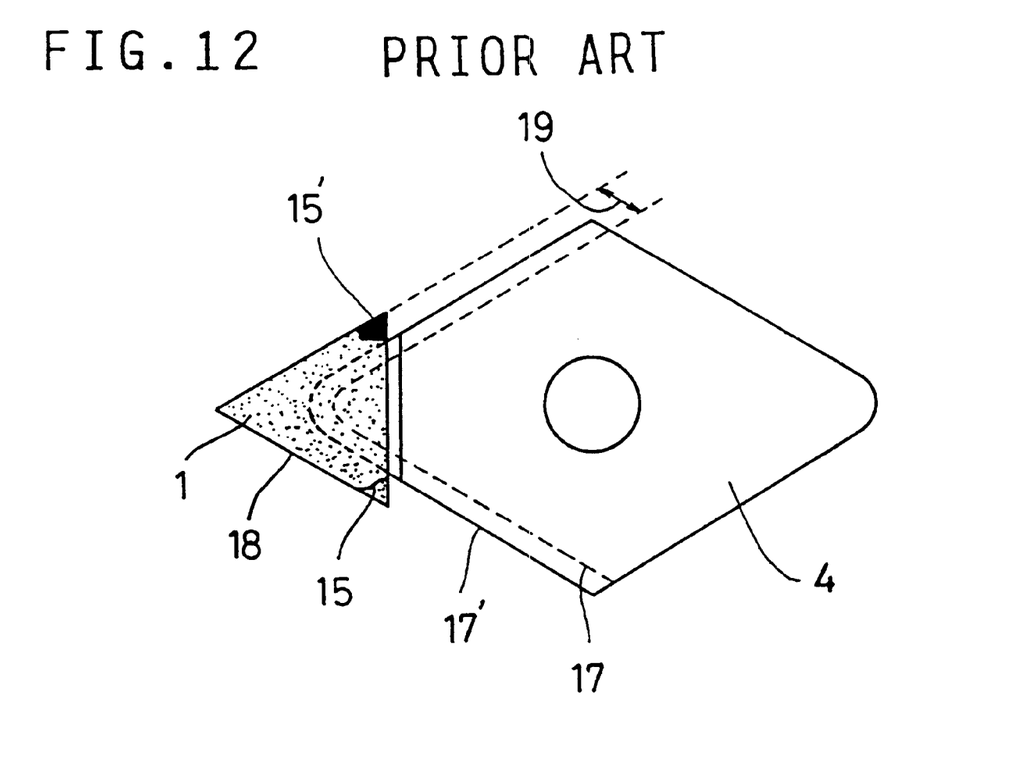
FIG. 12 is a front view showing a state before grinding in a conventional manufacturing method.
Figure 13:
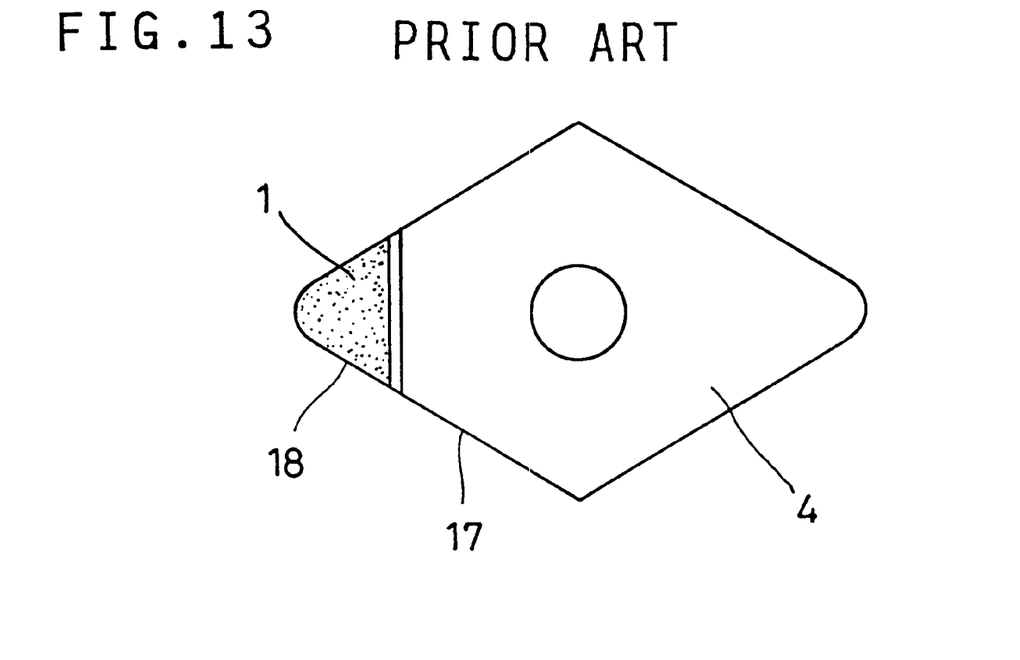
FIG. 13 is a similar view showing a state after grinding.
Figure 14A:
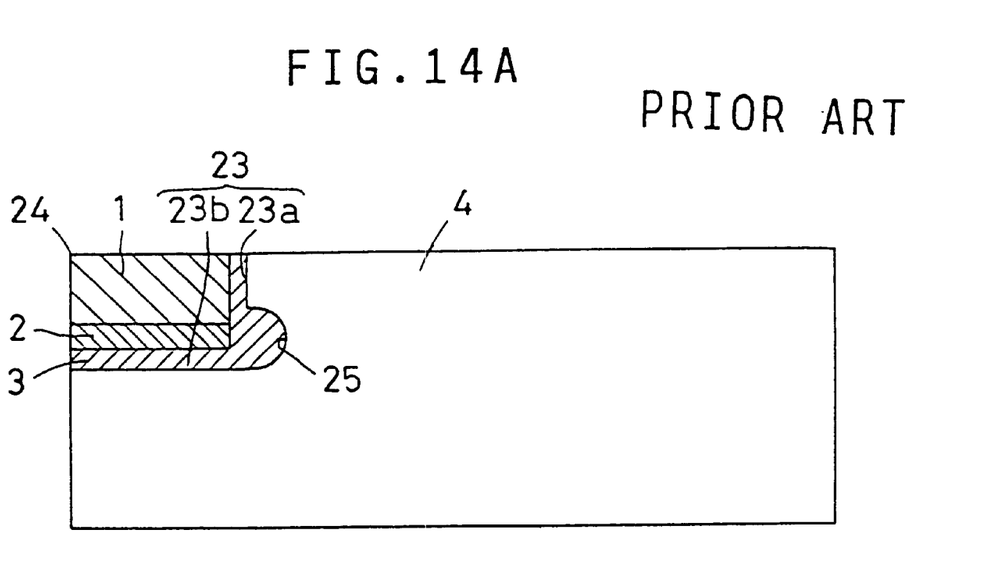
FIG. 14A is a side view of a conventional insert.
Figure 14B:
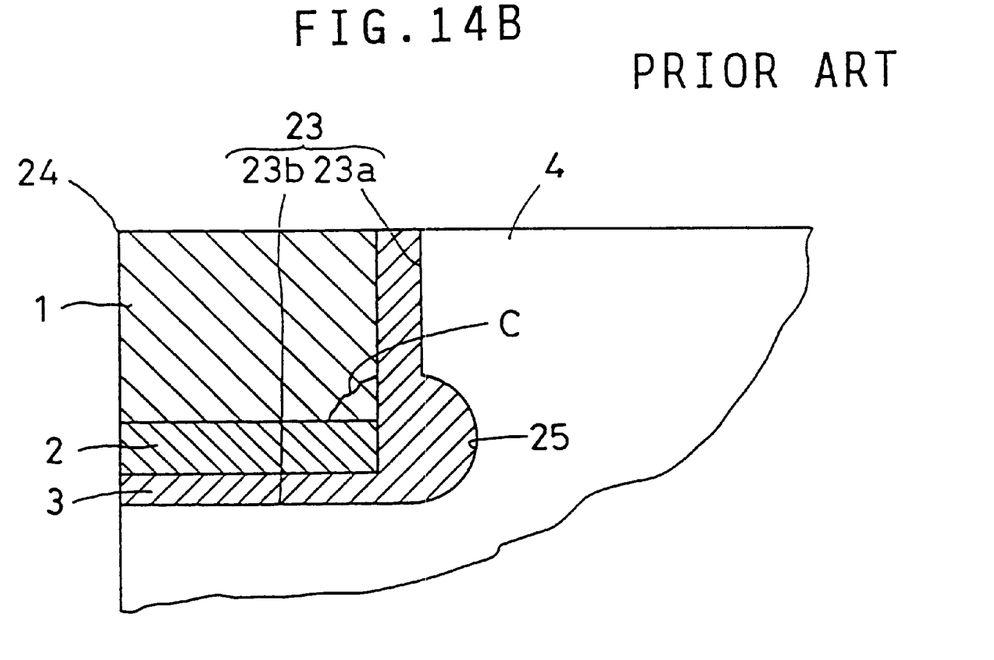
FIG. 14B is an enlarged side view of the same.
Figure 15A:
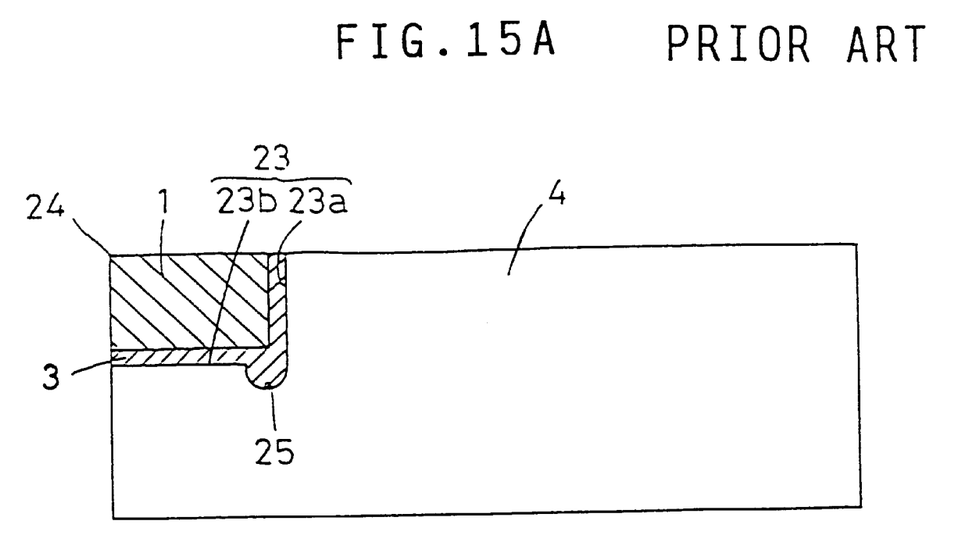
FIG. 15A is a side view of another conventional insert.
Figure 15B:
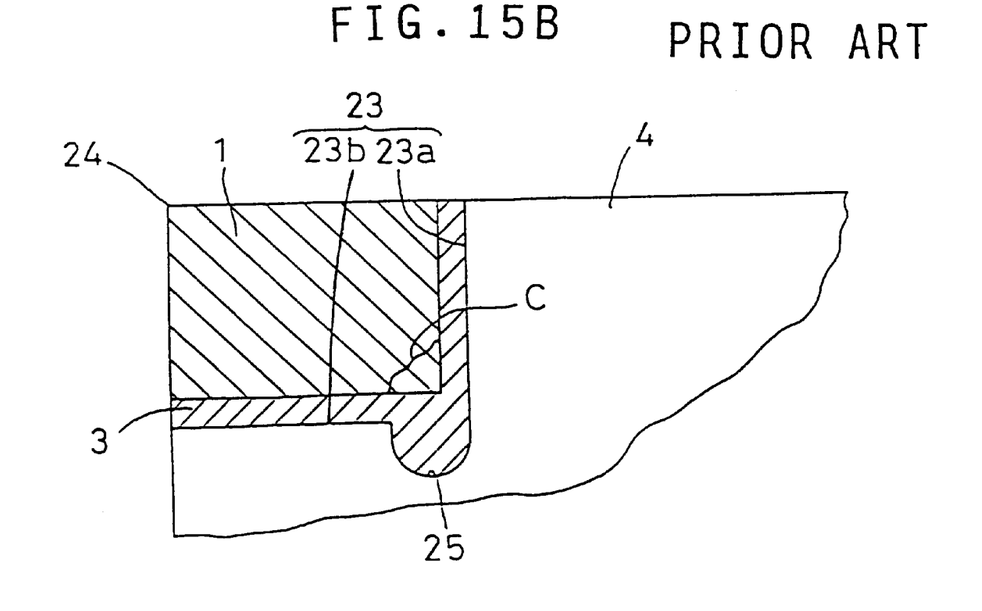
FIG. 15B is an enlarged side view of the same.

FIGS. 12 and 13 show how a conventional insert is manufactured. Chipping and cracking tend to occur presumably due to the shape of cutting edge tips of the hard sintered body having an acute angle. Such chipping or cracks tend to start from the ridge of the hard sintered body. In order to remove such chipping or cracks, after brazing the hard sintered body, it is effective to grind the ridge 18 of the hard sintered body 1 and the ridge 17' of the tool substrate 4 simultaneously, or separately until the chips or cracks are removed.

But if the tool substrate, which is typically made from a relatively soft material such as cemented carbide, is ground together with the hard sintered body, the grinder tends to loading due to a large difference in hardness between the two bodies. Grinding simultaneously was therefore extremely labor-intensive. Since conventional insert bodies had long ridges that had to be ground simultaneously, grinding was all the more troublesome.

Figures 6, 6A, 7:
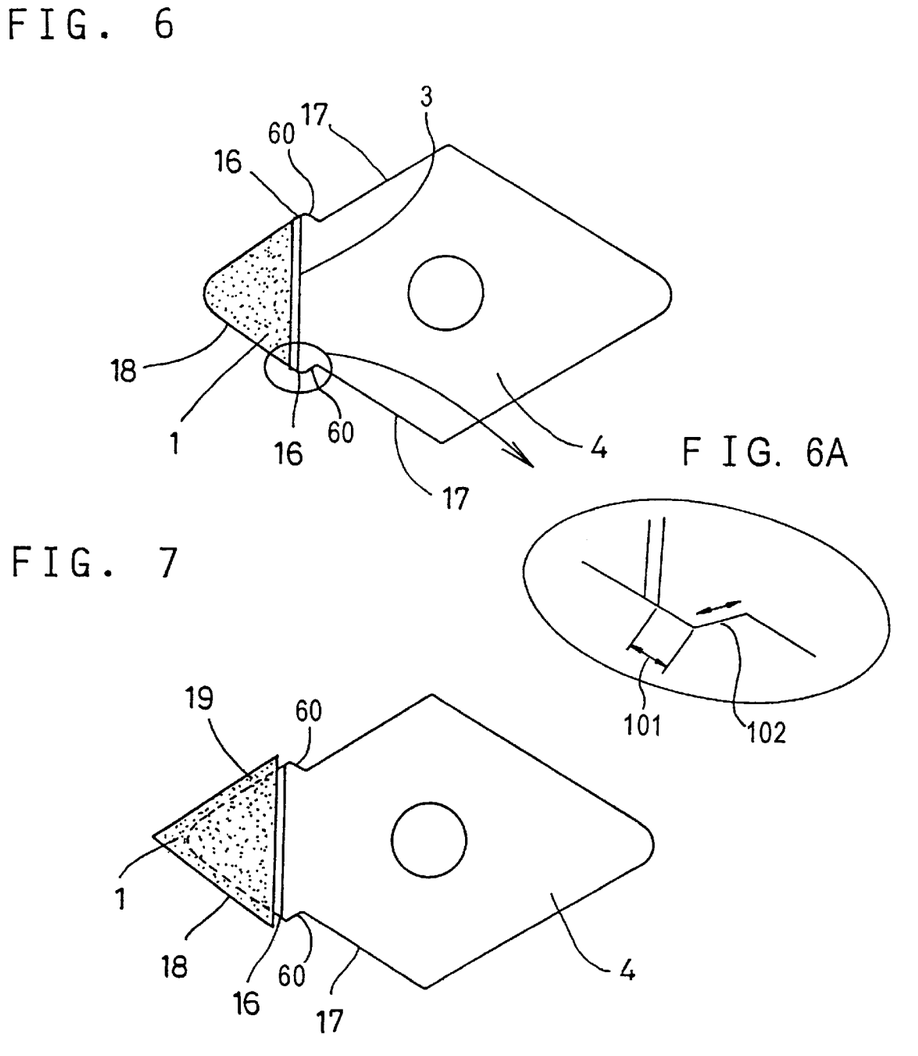
FIG. 6 is a front view of an insert embodying the present invention.
FIG. 6A is an exploded view of a portion of the embodiment shown in FIG. 6.
FIG. 7 is a front view of the same before being ground.
Figure 8:
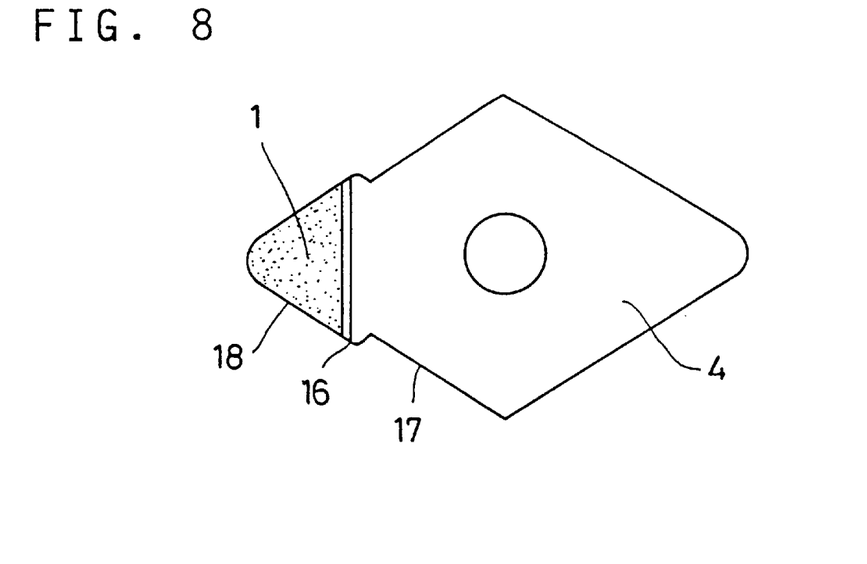
FIG. 8 is a front view of the same after grinding.
Figure 9A:
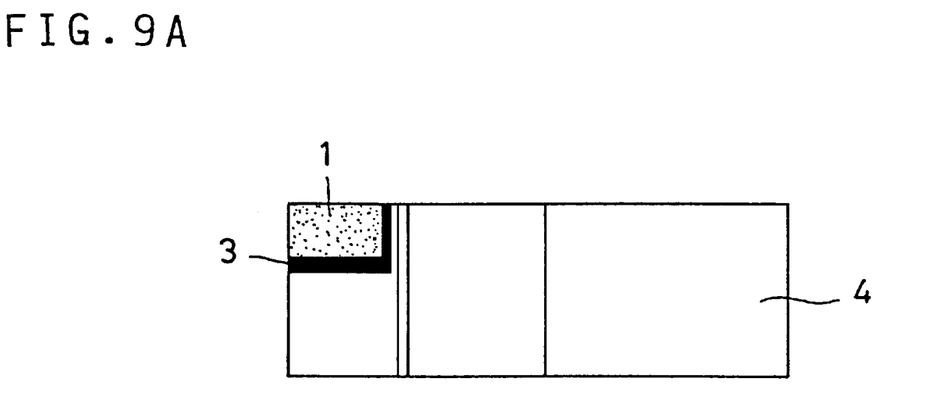
FIGS. 9A and 9B are side views of the same.
Figure 9B:
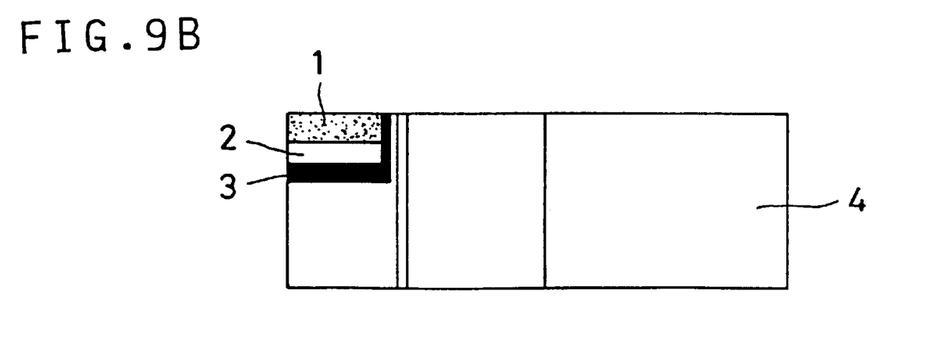

In contrast, the insert according to the present invention, shown in FIGS. 7 and 8, has first ridges 16 adjacent the tool substrate, and second ridges 17 provided nearer to the inscribed circle of the tool than are the first ridges 16 with a step 60 therebetween. As shown in the exploded portion of FIG. 6, the first ridge has a length 101 of 0.1 to 2.0 mm, and the step 102 has a height of 0.01 to 1 mm. Thus, in the grinding step, only the short first ridges 16 are ground while the second ridges are not, so that chipping and cracks formed in the hard sintered body can be removed more easily.

The hard sintered body insert according to the present invention comprises a polygonal tool substrate 4, and a hard sintered body 1 bonded to a corner of the tool substrate 4 and containing diamond or cubic boron nitride by 20 vol % or more. Each of the two ridges of the tool substrate extending from the corner comprises a first ridge 16 aligned with and adjacent to a ridge 18 of the hard sintered body, and a second ridge 17 provided nearer to the tool inscribed circle than is the ridge 18 of the hard sintered body.

For efficient grinding, the first ridges 16 of the tool substrate are preferably not longer than 2.0 mm but not shorter than 0.1 mm, because if shorter than 0.1 mm, cracks formed in the hard sintered body during brazing may extend to the first ridges 16. This may cause a portion of the tool substrate including the first ridge to chip off together with the cracked portion of the hard sintered body.

If the insert is formed by grinding only the ridges of the hard sintered body and the first ridges of the tool substrate, at the end of grinding, the first ridges 16 will be connected to the second ridges 17 through steps 60 0.01 mm or more in height. But if these steps 60 are higher than 1 mm, the protruding portion of the hard sintered body will be so large that the clamping rigidity of the insert will be poor, thus increasing the possibility of chattering during use. Thus, these steps numeral 60 should be preferably 0.01–1.0 mm high.

Even if the hard sintered body is bonded to the tool substrate in the method described above, crack or chipping may develop in the hard sintered body due to the difference in thermal expansion between the hard sintered body and the bonding layer in the brazing step, depending on the shape of the seating groove.

As shown in FIGS. 14A–15B, a recess 25 is formed at the corner of the side face 23a or the bottom 23b of the seating groove 23 to avoid interference with the edge of the hard sintered body. But the recess 25 locally increases the brazing filler layer, thus causing stress concentration, which in turn promotes cracking and breakage of the hard sintered body as shown at C in FIGS. 14B and 15B.

In contrast, with the insert of the present invention shown in FIGS. 16A–18, the upright side face and the bottom of the seating groove intersect at an angle smaller than the intersecting angle between the back side and the bottom of the hard sintered body, so that a recessed portion is formed at the corner of the seating groove without the need to form the recess 25.

Thus, the thickness of the brazing filler layer increases gradually toward the center of the insert. This prevents local stress concentration, thus reducing the possibility of the hard sintered body getting cracked or broken during brazing.

A hard sintered body having a bottom and a back side intersecting at a right angle (that is, the angle at lower back edge being 90°) would be easier to manufacture. If the intersecting angle between the upright side face and the bottom of the seating groove is over 87°, the effect of the recessed portion will be insufficient. Also, the hard sintered body tends to be brazed inclined. on the other hand, if this intersecting angle is less than 750°, the brazing filler layer will be so thick at the lower back edge of the hard sintered body that it may become difficult to prevent cracking or breakage, depending upon the brazing conditions. The intersecting angle should therefore be within the range of 75° and 87°.

By connecting the upright side face with the bottom through a curved surface, it is possible to avoid stress concentration at the corner of the seating groove due to cutting resistance. If the radius of curvature of the curved surface is over 0.3 mm, the effect of provision of the recessed portion will be insufficient. If less than 0.1 mm, the effect of the curved surface may be insufficient. Thus, the radius of curvature of the curved surface should be 0.1 mm–0.3 mm.

In FIGS. 16A–18, the insert 10 of each embodiment has a tool substrate 4 made from cemented carbide and formed with a seating groove 23 at one corner. A hard sintered body 1 containing diamond or cBN by 20% by volume or more is brazed in the seating groove 23. The hard sintered body 1 shown in FIG. 16 has a support layer 2 made from cemented carbide and bonded to its bottom. The sintered bodies of FIGS. 17 and 18 have no such support layer and are made from a single material. After brazing, the ridge of each hard sintered body 1 is ground to form a cutting edge 24.

Each seating groove 23 formed in the tool substrate 2 is defined by an upright side face 23a and a bottom 23b. The hard sintered body 1 of any of the inserts 10 shown has a lower back edge angle of 90°, while the intersecting angle θ formed by the upright side face 23a and the bottom 23b is 90° or less (preferably 75°–87°).

Figure 16A:
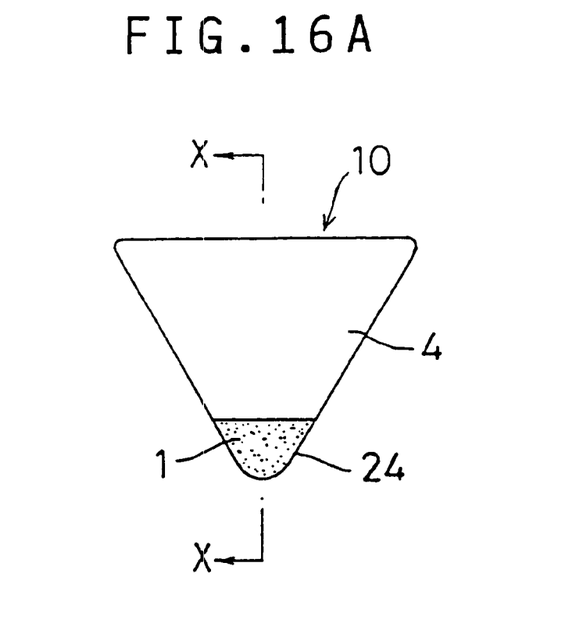
FIG. 16A is a plan view of an insert embodying this invention.
Figure 16B:
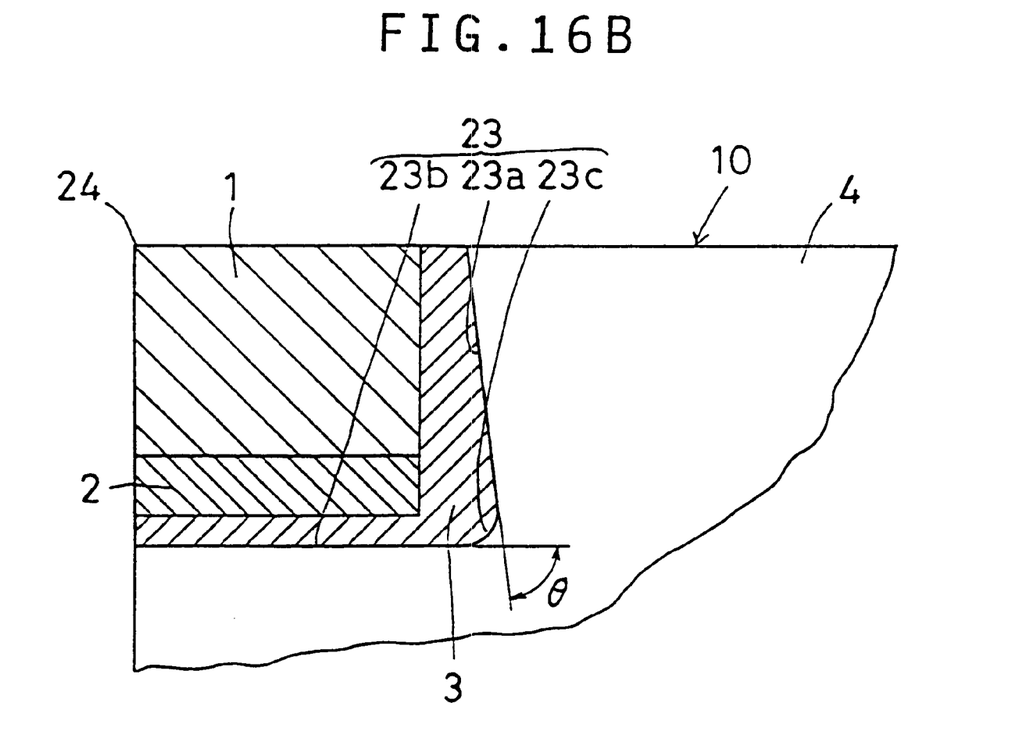
FIG. 16B is an enlarged sectional view taken along line X—X of FIG. 16A.
Figure 17:
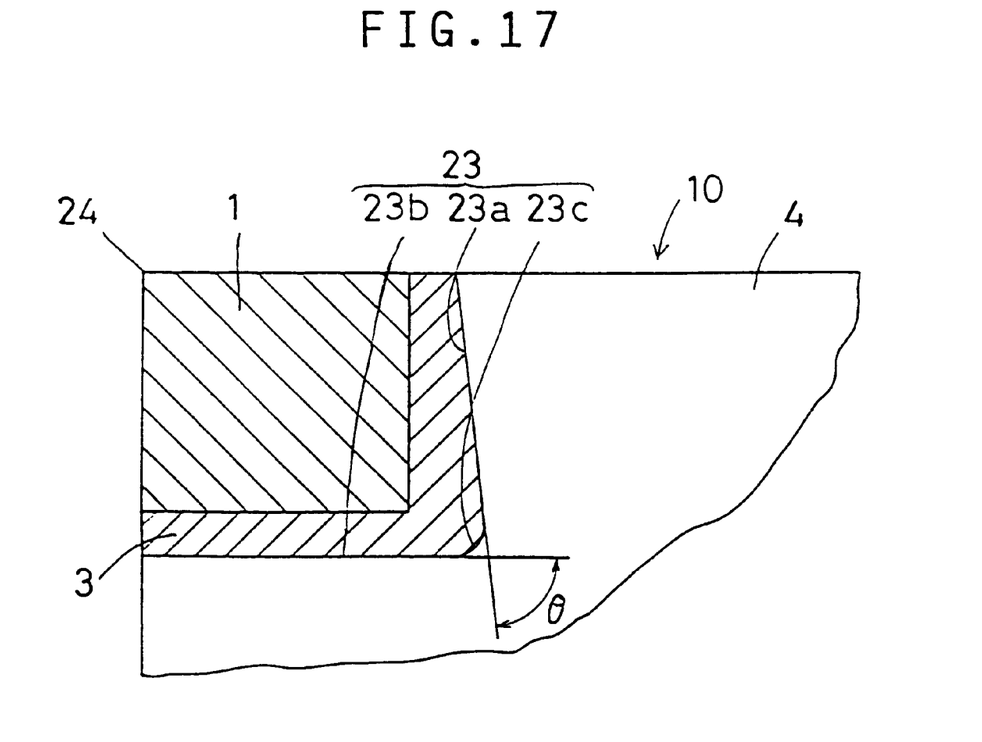
FIG. 17 is a partial enlarged sectional view of another embodiment.
Figure 18:
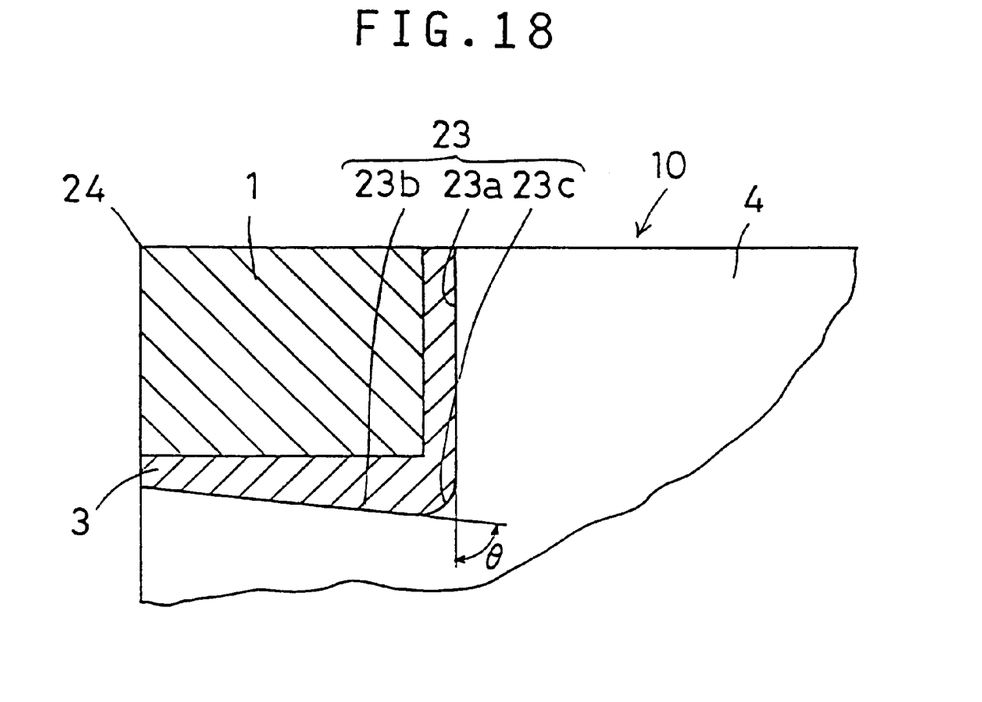
FIG. 18 is a partial enlarged sectional view of still another embodiment.

In the embodiments of FIGS. 16A, 16B and 17, the bottom 23b extends parallel to the top surface of the tool substrate 2 so that the bottom surface 23b can be used as a reference in positioning the hard sintered body 1 when it is brazed. In the embodiment of FIG. 18, the side face 23a, which extends perpendicularly to the top surface of the tool substrate 2, may be used as a reference in positioning the hard sintered body 1.

In any of the embodiments, the corner of the seating groove 23, namely, the connecting portion of the side face 23a and the bottom 23b forms a curved surface 23c having a radius of curvature of 0.1 mm–0.3 mm.

The insert of this invention may have a triangular shape as viewed from above as shown in FIG. 16A, or may be square, diamond-shaped or of any other shape.

FIGS. 1–4 show hard sintered tools embodying this invention. The tools shown are all examples as applied to throwaway inserts for cutting.

Figure 1:
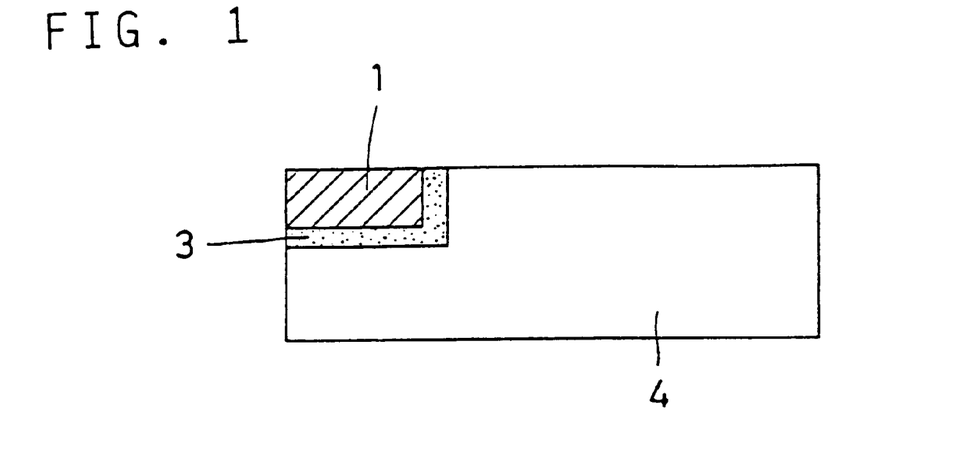
FIG. 1 is a sectional view of a cutting tool embodying the present invention.
Figure 2:
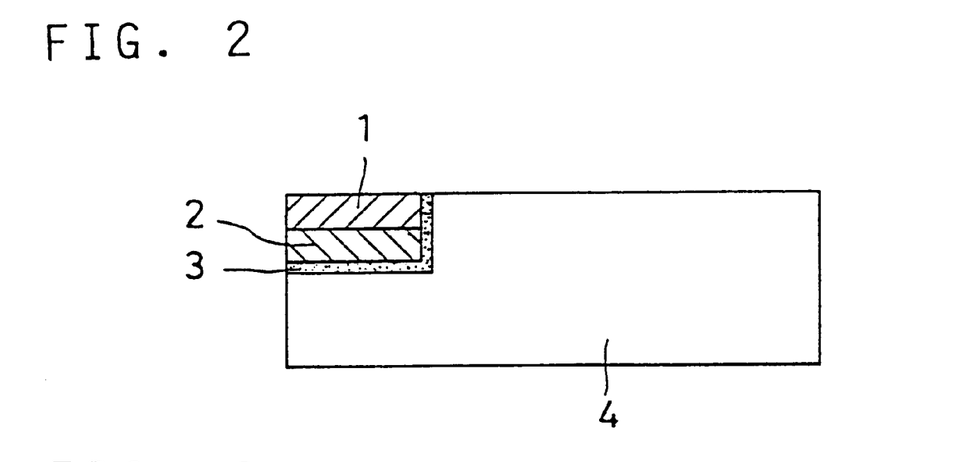
FIG. 2 is a sectional view of another embodiment.

In the figures, numeral 1 is a hard sintered body containing diamond or cubic boron nitride by 20 vol. % or more, 2 is a cemented carbide support lined to the hard sintered body 1 by integral sintering for supporting it, and 3 is a bonding layer for bonding the hard sintered body of FIG. 1 or the composite sintered body of FIG. 2 to a tool substrate 4. This bonding layer is a layer formed by a brazing filler and comprises Ti and Cu. Zr and Cu, or Ti, zr and Cu, with Ni added optionally. The contents of Ti, Zr and Ni have to be within the range specified in the present invention. The tool substrate 4 is made of a cemented carbide.

Figure 3:
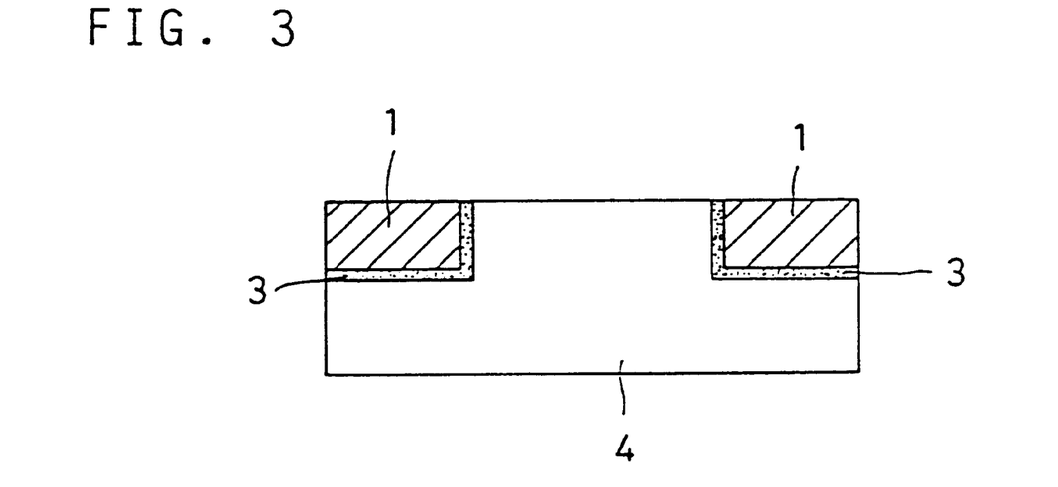
FIG. 3 is a sectional view of still another embodiment.
Figure 4:
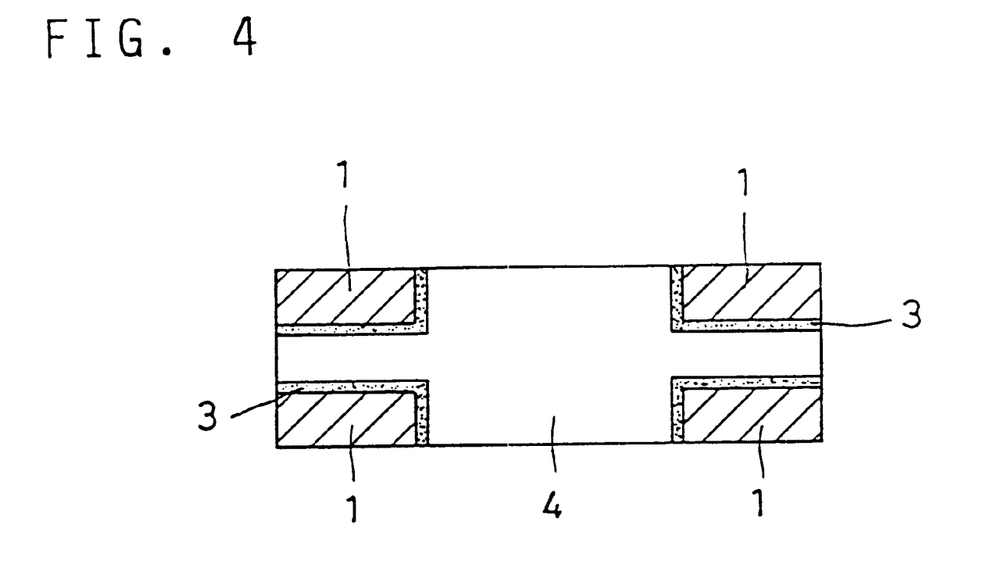
FIG. 4 is a sectional view of still another embodiment.

In the embodiments of FIGS. 1 and 2, a hard sintered body 1 is mounted on only one corner of the tool substrate 4 on one side thereof. But such sintered bodies may be mounted on both corners of one side as shown in FIG. 3 or all the corners of the tool substrate as shown in FIG. 4.

EXAMPLE 1

Table 1 shows various brazing materials prepared to examine the influence of the Ti and Zr content in the bonding layer on the bond strength and the cutting performance.

The brazing materials 1A–1D in Table 1 have different Cu, Ti and Zr contents from one another.

In order to prepare specimens for the brazing material, brazing material powders having compositions shown in Table 1 were prepared and mixed with an organic solvent (terpineol $C_{10}H_{18}O$) to form pasty brazing materials 1A–1D. In order to evaluate the bond strength between the cubic boron nitride sintered body and the tool substrate of cemented carbide, 10 mm-long rod-shaped samples of cubic boron nitride having a 2.5 mm square section and a longitudinal length of 10 mm and samples of cemented carbide substrate were prepared. The brazing materials 1A–1D were then applied to their bonding surfaces and the samples were heated under a vacuum of $1 \times 10^{-5}$ torr at temperatures shown in Table 1. Then, four sides of specimens 2A–2D bonded by bonding materials 1A–1D were machined on four sides so that they have a 2×2 mm square section, and the shear strength at the bonding portion was measured for each specimen. Table 2 shows the results of measurement.

For specimen 2D, since the Ti and Zr contents were high, the melting point rose, so that the brazing material had to be heated to a high temperature to melt it. Cracks thus formed in the cubic boron nitride sintered body, making it impossible to measure the bond strength.

In contrast, specimens 2A–2C showed high bond strength. In particular, for specimens 2B and 2C, which are within the scope of the present invention, destruction did not start from the bonding layer due to high Ti and Zr contents. Thus they showed high bond strength.

Then, in order to evaluate the cutting performance, cubic boron nitride sintered bodies were bonded to tool substrates of cemented carbide using brazing materials 1A–1C to form test tools 3A–3C shown in FIG. 1 and Table 3. Cutting tests were performed under the following conditions. The cubic boron nitride sintered bodies used were 0.75 mm thick.

Workpiece: round rod of carburized steel (SCM415)
Hardness of workpiece: HRC62
Peripheral speed of workpiece: 200 m/min
Depth of cut: 0.5 mm
Feed rate: 0.16 mm/rev
Cutting time: 5 min As a result, for tool 3A, due to low heat resistance of the bonding layer, the brazing strength dropped due to cutting heat during cutting, causing the hard sintered body to drop off. Thus, it was impossible to continue evaluation. In contrast, for tools 3B and 3C, which satisfy the claimed requirements of the present patent, the bond strength of the hard sintered body was high and the high-temperature strength was good, so that no dropping or chipping of the hard sintered body occurred during cutting. Stable machining was thus possible.

EXAMPLE 2

Table 4 shows various brazing materials prepared to examine the influence of the Ni content in the bonding layer on the high-temperature strength. The brazing materials 4A–4D in Table 4 have different Ni contents from one another.

The specimens were prepared by preparing brazing material powders having compositions shown in Table 4, mixing them with an organic solvent (ethanol) to obtain pasty brazing materials 4A–4D. In order to evaluate the bonding strength between the cubic boron nitride sintered body and the cemented carbide tool substrate, 10 mm long rod-shaped samples (of 2.5 mm square section) of cubic boron nitride sintered bodies and cemented carbide substrates were prepared. Brazing materials 4A–4D were applied to their bonding surfaces and they were bonded together by heating them in an Ar atmosphere at temperatures shown in Table 4. Then, specimens 5A–5D bonded together by brazing materials 4A–4D were machined on their longitudinal four sides so that they have a 2×2 mm square section. The bonding layer was 30 μm thick. Table 5 shows the results of evaluation of the shear strength of the specimens in a high-temperature atmosphere of 350° C.

For specimen 5D, the Ni content in the brazing material was high, so that the melting point rose. Thus, the brazing material melted only at a high temperature. The cubic boron nitride sintered body thus cracked, making it impossible to measure the bond strength.

In contrast, specimens 5A–5C showed high bond strength. In particular, 5B and 5C, which were within the scope of the claims of the present invention and were high in Ni content, were less likely to oxidize at the bonding layer at high temperature, and high in high-temperature strength.

EXAMPLE 3

Table 6 shows various cutting tools prepared to examine the influence of the thickness of the hard sintered body to be bonded on the cutting performance.

Cutting tools 6A–6D in Table 6 were prepared by bonding diamond sintered body to tool substrates of cemented carbide through brazing materials shown in Table 6 in the same manner as in EXAMPLE 1. They were evaluated for cutting performance under the following conditions:

Workpiece: Al-18 wt % Si round rod having four axial grooves
Peripheral speed of workpiece: 500 m/min
Depth of cut: 1.5 mm
Feed rate: 0.2 mm/rev
Cutting time: 10 min
Table 7 shows the results of measurement.

For tool 7A, because the diamond sintered body was thin, cutting heat produced at the cutting edge flowed in a large amount into the bonding layer, softening it and lowering the bond strength. This resulted in chipping of the tool during cutting. In contrast, for specimens 7B–7D, because the diamond sintered bodies were thick, cutting heat produced at the cutting edge was dispersed and dissipated, so that no softening of the bonding layer occurred. Thus, it was found out that high bond strength was maintained and stable machining was possible.

EXAMPLE 4

Table 8 shows cutting tools prepared to mainly examine the effect of the composition of bonding layer on the cutting performance.

For cutting tools 8A–8F in Table 8, brazing fillers shown in Table 8 were used to bond a diamond sintered body supported by a cemented carbide member under the respective brazing conditions to the tool substrate. The compositions of the bonding layers formed by the heat-bonding step are shown in Table 9. Table 10 shows the results of performance evaluation tests for the cutting tools 8A–8F under the following cutting conditions:

Workpiece: Al-20 wt % Si round rod with four axial grooves
Peripheral speed of workpiece: 800 m/min
Depth of cut: 5.0 mm
Feed rate: 0.35 mm/rev
Cutting time: 20 min For tools 9A and 9C, which are inferior in high-temperature strength, a large amount of cutting heat produced at the cutting edge flowed to the bonding layer, thus softening the bonding layer and lowering the bond strength. Tools chipped as a result. In contrast, for tools 9B, 9D, 9E and 9F, which were heated under vacuum, no softening of the bonding layer occurred, so that the bond strength was maintained high. Stable machining was thus possible.

EXAMPLE 5

Table 11 shows various inserts prepared to examine the effect of the steps between the first and second ridges on the bond strength, cutting performance, and manufacturing cost. That is, the inserts listed in Table 11 have on their tool substrates first ridges connecting with the hard sintered body, and second ridges provided nearer to the tool inscribed circle than are the first ridges. The first ridges and the steps therebetween of the respective inserts have different dimensions from each other.

In order to manufacture the inserts, tool substrates made of cemented carbides and having first and second ridges as shown in Table 11 were prepared. Then, a cubic boron nitride sintered body lined with a cemented carbide was brazed to a corner of each polygonal tool substrate using a brazing filler having a 25Ti—25Zr—50Cu composition in a vacuum of $1 \times 10^{-4}$ torr.

Then, in order to form cutting edges along the ridges of each cubic boron nitride sintered body, only the ridges of the sintered body alone were ground, or these ridges and the first ridges of the tool substrate were ground simultaneously. Table 12 shows the time taken for grinding and the presence of cracks remaining for each specimen. In order to remove cracks 0.2 mm in depth which were observed at the tip of each hard sintered body, it was necessary to grind each ridge to the depth of 0.25 mm.

As a result, for specimens 12A, 12B, 12C, 12D and 12E, since the cemented carbide portion was cut together with the hard sintered body, the grinding wheel soon loaded, and grinding took a long time. For specimens 12I and 12M, too, which had long first ridges, grinding took a long time for the same reason as above.

On the other hand, for specimens 12F and 12J, which had short first ridges, cracks formed in the hard sintered body during brazing extended to the thin first ridges of the tool substrate. They were not removable.

In contrast, for specimens 12G, 12H, 12K and 12L, cracks formed during brazing were easily removable.

For these four specimens, in order to further evaluate the cutting performance, cutting test was conducted under the following conditions. The results are shown in Table 13.

Workpiece: carburized steel (SCM415) having 6 longitudinal grooves

Hardness of workpiece: HRC62

Peripheral speed of workpiece: 200 m/min

Depth of cut: 0.5 mm

Feed rate: 0.16 mm/rev

Cutting time: 5 min

As a result, for specimen 13K and 13L, which were large in amount of the portion protruding from the hard sintered body, chattering occurred during cutting, which resulted in chipping of the hard sintered body at its cutting edge. Thus, the test had to be stopped.

In contrast, for specimens 13G and 13H, which are examples according to the present invention, stable machining was possible with no chattering during cutting.

EXAMPLE 6

Table 14 shows diamond sintered body inserts prepared to examine the influence of the thickness of the hard sintered body to be bonded on the cutting performance. That is, the inserts in Table 14 were prepared in the same manner as in EXAMPLE 5 by bonding diamond sintered bodies to tool substrates of cemented carbide by use of brazing fillers shown in Table 14. After cutting edges were formed by grinding, the first ridges of each tool substrate had a length of 1.0 mm and the steps between the first and second ridges were 0.3 mm.

Table 15 shows the results of cutting evaluation for the samples of Table 14.

As a result, for the tool 15A, cutting heat produced at the cutting edge flowed in a large amount into the bonding layer because the diamond sintered body was thin. This resulted in the chipping of the tool during cutting due to the softening of the bonding layer and the lowering of the bond strength. In contrast, for 15B–15D, cutting heat produced at the cutting edge dispersed and dissipated because the diamond sintered body was thick. Thus, the bonding layer did not soften, so that high bond strength was maintained. Stable machining was thus possible.

But for specimen 15D, a long time was needed for grinding as shown in Table 14. Thus, much labor was needed to manufacture this insert. Thus, only specimens 15B and 15C, which were within the scope of the present invention, were high in cutting performance and economical as well. The evaluation was made under the following conditions:

Workpiece: Al-18 wt % Si round rod having four axial grooves

Peripheral speed of workpiece: 600 m/min

Depth of cut: 1.5 mm

Feed rate: 0.2 mm/rev

Cutting time: 10 min

The bonding layers used in this invention is high in both heat resistance and corrosion resistance, and they can wet with the hard sintered body and are high in rigidity. Thus, such fillers impart especially large stress to the hard sintered body during brazing. Therefore, it is extremely important to suppress stress concentration to prevent cracking or breakage of the sintered body so that the effect of this invention will become conspicuous.

EXAMPLE 7

Seven kinds of tool substrates made of cemented carbide and having different intersecting angles formed by the side and the bottom of the seating grooves as shown in Table 16 were prepared. A sintered body of cBN (having a lower back edge angle of 90°) containing 55% by volume cubic boron nitride was brazed to the seating groove (with a curved face having a radius of curvature of 0.2 mm at corner) of each tool substrate using a brazing filler having a composition of 25% Ti—25% Zr—50% Cu in weight percent in a vacuum of $1 \times 10^{-1}$ torr.

Then, cutting edges were formed by grinding the ridges of the respective sintered body of cBN.

The thus formed seven kinds of inserts (Specimens 16A–16G) were observed to determine if there was anything abnormal on the sintered body, and also the maximum thickness of the brazing filler layer of each specimen was measured.

The results are shown in Table 16.

For Specimens 16F and 16G, the brazing layer was too thick at the recessed portion of the seating groove, so that the strain grew large due to shrinkage of the brazing layer. This produces a large strain and increases chance of cracking in the sintered body. (In fact, some of Specimens 16F and 16G suffered cracks).

For Specimen 16A, the lower back edge angle of the sintered cBN bodies was equal to the corner angle of the seating grooves, so that no effect was observed by the formation of recessed portion. The sintered cBN bodies were thus brazed inclined.

For Specimens 16B–16E, no inclination of the sintered bodies, no cracks, or no other abnormality was observed. They were exactly as designed.

EXAMPLE 8

In order to examine what influence the sectional shape of the connecting portion between the upright side face and the bottom of each seating groove formed in the tool substrate has on the bonding strength of the hard sintered body and the cutting performance of the insert, five kinds of Specimens 17A–17E (inserts) shown in Table 17 were prepared. For each specimen, the intersecting angle between the upright side face and the bottom of each seating grove was 85°, and the upright side face and the bottom were connected together by a curved surface. The curved surfaces of the respective specimens had different radii of curvature as shown in Table 17. A cBN sintered body (cBN content: 55 vol %, lower back edge angle: 90°) having a support layer made of cemented carbide bonded to its back was brazed to the seating groove of each tool substrate using a brazing filler having a composition of 40Ti—20Zr—25Cu—15Ni in an atmosphere containing argon at 850° C. . Cutting edges were finished by grinding.

Table 17 shows the bonding condition for Specimens H-L, and whether or not cracks were found.

For Specimen 17E, the effect of provision of recessed portion was lost because the curved surface had too large a radius of curvature. As a result, the hard sintered bodies were brazed inclined.

For Specimens 17A–17D, mounting condition was good and no cracks were found in the hard sintered bodies.

For Specimens 17A–17D, cutting performance test was conducted under the following conditions.

Workpiece: Carburized steel (SCM 415) having six longitudinal grooves in the outer periphery Hardness of workpiece: HRC62

Cutting speed at the surface of the workpiece: 200 m/min

Depth of cut: 0.8 mm

Feed rate: 0.2 mm/rev

Cutting time: 5 minutes

As a result of the test, Specimen 17A chipped at the corner of the seating groove due to concentration of stress resulting from cutting force on this portion. Chipping occurred because the curved surface forming the seating groove corner had too small radius of curvature.

For Specimens 17B, 17C and 17D, the radii of curvature of the curved surfaces were suitable, so that no stress concentration occurred. Cutting was thus performed stably.

Table 18 shows the depth of wear on the flank of each of Specimens 17B, 17C and 17D as measured after they have been used for cutting for five minutes.

According to the present invention, since the bonding layer for bonding the hard sintered body to the tool substrate is a layer comprising 15–65 wt % Ti and/or Zr, and Cu, the hard sintered body can be bonded strongly and rigidly without the possibility of breakage and cracks. Copper contained in the bonding layer is higher in elastic modulus than conventional Ag and can absorb strains due to a thermal expansion difference. Ti or Zr is high in high-temperature strength and activity. Thus by adding Ti or Zr to Cu, wettability of the bonding material improves. This markedly improves bond strength.

As a result, it becomes possible to prevent dropout and chipping of the hard sintered body during cutting. Stable cutting is thus possible.

If this invention is applied to cutting tools, remarkable effects are expectable. But this invention will also exhibit its effectiveness when used in drills, wear-resistant tool and wire-drawing dies.

TABLE 1

| Specimen of bonding material | Composition of bonding material | Bonding temperature |
|---|---|---|
| 1A | 5Ti · 5Zr · 90Cu | 910° C. |
| 1B | 15Ti · 15Zr · 70Cu | 900° C. |
| 1C | 25Ti · 25Zr · 50Cu | 850° C. |
| 1D | 30Ti · 40Zr · 30Cu | 1100° C. |

(1B and 1C embody the present invention)

TABLE 2

| Specimen | Shear load (kgf) | Shear strength (kgf/mm$^2$) |
|---|---|---|
| 2A | 102 | 25.5 |
| 2B | 153 | 38.3 |
| 2C | 201 | 50.3 |
| 2D | unmeasurable | unmeasurable |

TABLE 3

| Specimen | Width of flank wear ($\mu$m) |
|---|---|
| 3A | Hard sintered body dropped out |
| 3B | 125 |
| 3C | 121 |

(3B and 3C embody the present invention)

TABLE 4

| Specimen of bonding material | Composition of bonding material | Bonding temperature |
|---|---|---|
| 4A | 40Ti · 20Zr · 40Cu | 910° C. |
| 4B | 40Ti · 20Zr · 25Cu · 15Ni | 880° C. |
| 4C | 40Ti · 20Zr · 15Cu · 25Ni | 920° C. |
| 4D | 40Ti · 20Zr · 5Cu · 35Ni | 1110° C. |

(4B and 4C embody the present invention)

TABLE 5

| Specimen | Shear load (kgf) | Shear strength (kgf/mm$^2$) |
|---|---|---|
| 5A | 82 | 20.5 |
| 5B | 121 | 30.3 |
| 5C | 133 | 33.3 |
| 5D | unmeasurable | unmeasurable |

TABLE 6

| Tool specimen | Composition of bonding material | Bonding temperature | thickness of diamond sintered body (nm) |
|---|---|---|---|
| 6A | 15Ti · 15Zr · 60Cu | 810° C. | 0.2 |
| 6B | 15Ti · 15Zr · 60Cu | 810° C. | 0.5 |
| 6C | 15Ti · 15Zr · 60Cu | 810° C. | 1.0 |
| 6D | 15Ti · 15Zr · 60Cu | 810° C. | 1.5 |

(6B, 6C, 6D embody the present invention)

TABLE 7

| Specimen | Width of flank wear ($\mu$m) |
|---|---|
| 7A | chipped |
| 7B | 105 |
| 7C | 116 |
| 7D | 101 |

(7B, 7C, 7D embody the present invention)

TABLE 8

| Tool specimen | Composition of brazing filler | Bonding temperature | Bonding atmosphere |
|---|---|---|---|
| 8A | 59Ag-23Cu-13In-5Ti | 700° C. | in Ar gas |
| 8B | 59Ag-23Cu-13In-5Ti | 700° C. | in vacuum (1 × 10$^{-5}$ torr) |
| 8C | 70Ag-25Cu-5Ti | 810° C. | in Ar gas |
| 8D | 70Ag-25Cu-5Ti | 810° C. | in vacuum (1 × 10$^{-5}$ torr) |
| 8E | 25Ti-25Zr-50Cu | 830° C. | in Ar gas |
| 8F | 25Ti-25Zr-50Cu | 830° C. | in vacuum (1 × 10$^{-5}$ torr) |

TABLE 9

| Tool specimen | Composition of bonding layer after heat treatment |
|---|---|
| 9A | 59Ag-23Cu-13In-5Ti |
| 9B | 82Cu-18Ti |
| 9C | 70Ag-25Cu-5Ti |
| 9D | 84Cu-16Ti |
| 9E | 25Ti-25Zr-50Cu |
| 9F | 25Ti-25Zr-50Cu |

TABLE 10

| Tool specimen | Depth of wear on the flank |
|---|---|
| 9A | chipped |
| 9B | 301 μm |
| 9C | chipped |
| 9D | 300 μm |
| 9E | 289 μm |
| 9F | 303 μm |

TABLE 11

| Sample | Length of first ridge of tool substrate (mm) | Step (mm) between first and second ridges of tool substrate |
|---|---|---|
| 11A | — | 0 |
| 11B | 0.05 | 0.23 |
| 11c | 0.15 | 0.23 |
| 11D | 1.0 | 0.23 |
| 11E | 2.5 | 0.23 |
| 11F | 0.05 | 0.8 |
| 11G | 0.15 | 0.8 |
| 11H | 1.0 | 0.8 |
| 11I | 2.5 | 0.8 |
| 11J | 0.05 | 1.4 |
| 11K | 0.15 | 1.4 |
| 11L | 1.0 | 1.4 |
| 11M | 2.5 | 1.4 |

TABLE 12

| Sample | | Length of first ridge after grinding (mm) | Step between first and second ridges after grinding (mm) | Cracks observed? | Machining time (sec.) |
|---|---|---|---|---|---|
| 12A | Comparative Example | — | 0 | No | 181 |
| 12B | Comparative Example | — | 0 | No | 91 |
| 12C | Comparative Example | — | 0 | No | 93 |
| 12D | Comparative Example | — | 0 | No | 98 |
| 12E | Comparative Example | — | 0 | No | 100 |
| 12F | Comparative Example | 0.05 | 0.55 | Yes | 49 |
| 12G | Example | 0.15 | 0.55 | No | 51 |
| 12H | Example | 1.0 | 0.55 | No | 57 |
| 12I | Comparative Example | 2.5 | 0.55 | No | 81 |
| 12J | Comparative Example | 0.05 | 1.15 | Yes | 48 |
| 12K | Comparative Example | 0.15 | 1.15 | No | 52 |
| 12L | Comparative Example | 1.0 | 1.15 | No | 53 |
| 12M | Comparative Example | 2.5 | 1.15 | No | 79 |

TABLE 13

| Specimen | | Width of flank wear (μm) |
|---|---|---|
| 13G | Example | 125 |
| 13H | Example | 121 |
| 13K | Comparative Example | Cutting edge broke |
| 13L | Comparative Example | Cutting edge chipped |

TABLE 14

| Tool specimen | | Composition of bonding material | Bonding temp. | Thickness of diamond sintered body (mm) | Grinding time (sec.) |
|---|---|---|---|---|---|
| 14A | Comparative Example | 25Ti—25Zr—50Cu | 820° C. | 0.2 | 149 |
| 14B | Example | 25Ti—25Zr—50Cu | 820° C. | 0.5 | 155 |
| 14C | Example | 25Ti—25Zr—50Cu | 820° C. | 1.0 | 175 |
| 14D | Comparative Example | 25Ti—25Zr—50Cu | 820° C. | 1.8 | 301 |

TABLE 15

| specimen | | Width of flank wear (μm) |
|---|---|---|
| 15A | Comparative Example | chipped |
| 15B | Example | 105 |
| 15C | Example | 116 |
| 15D | Comparative Example | 101 |

TABLE 16

| Specimen | | Angle between bottom surface and upright side | Max thickness of brazing layer | State of bond |
|---|---|---|---|---|
| 16A | Comparative Example | 90° | 55 μm | Hard sintered body inclined |
| 16B | Example | 87° | 60 μm | no cracks |
| 16C | Example | 85° | 98 μm | no cracks |
| 16D | Example | 80° | 179 μm | no cracks |
| 16E | Example | 75° | 288 μm | no cracks |
| 16F | Example | 70° | 373 μm | cracked |
| 16G | Example | 65° | 493 μm | cracked |

TABLE 17

| Specimen | Radius of curvature of curved surface | State of bond |
|---|---|---|
| 17A | 0.01 mm | no cracks |
| 17B | 0.1 mm | no cracks |
| 17C | 0.2 mm | no cracks |
| 17D | 0.3 mm | no cracks |
| 17E | 0.4 mm | Hard sintered body inclined |

TABLE 18

| Specimen | Width of flank wear |
|---|---|
| 17A | Cutting edge chipped |
| 17B | 198 μm |
| 17C | 210 μm |
| 17D | 188 μm |

What is claimed is:

1. A hard sintered body tool comprising a tool substrate and a hard sintered body containing not less than 20 vol. % of diamond or cubic boron nitride and bonded to said tool substrate through a bonding layer comprising at least one of Ti and Zr by 15–65 wt %, and copper, wherein the tool substrate is made of a cemented carbide.

2. A hard sintered body tool as claimed in claim 1 wherein said bonding layer comprises 20–30 wt % of Ti and 20–30 wt % of Zr.

3. A hard sintered body tool as claimed in claim 1 wherein said bonding layer further contains 10–30 wt % of Ni.

4. A hard sintered body tool as claimed in claim 1 wherein said bonding layer has a melting point of 700–1000° C.

5. A hard sintered body tool as claimed in claim 1 wherein said hard sintered body is directly bonded to said tool substrate through said bonding layer.

6. A hard sintered body tool as claimed in claim 5 wherein said hard sintered body is 0.25–1.5 mm thick.

7. A hard sintered body tool as claimed in claim 1 wherein said hard sintered body is bonded to a corner of a polygonal tool substrate and two ridges of the tool substrate on two side surfaces thereof, each side surface comprising a first ridge adjacent to and aligned with a ridge of said hard sintered body and a second ridge provided nearer to an inscribed circle of the tool than is the ridge of said hard sintered body.

8. A hard sintered body tool as claimed in claim 7 wherein said first ridge is 0.1–2.0 mm long.

9. A hard sintered body tool as claimed in claim 7 wherein said first and second ridges are connected together by a step having a height of 0.01–1 mm.

10. A hard sintered body tool as claimed in claim 1 wherein said tool substrate has a bottom and back side and is formed with seating grooves at corners, said hard sintered body brazed to one of said seating grooves, said hard sintered body having a ridge as a cutting edge, each of said seating grooves having an upright side face and a bottom intersecting each other at an angle smaller than the intersecting angle of the bottom and the back side of said hard sintered body.

11. A hard sintered body tool as claimed in claim 10 wherein the intersecting angle of said upright side face and the bottom of said seating grooves is between 75° and 87°.

12. A hard sintered body tool as claimed in claim 10 wherein said upright side and the bottom of each of said seating grooves are connected together by a curved surface having a radius of curvature of 0.1–0.3 mm.

13. A method of manufacturing the tool claimed in claim 1 wherein the hard sintered body containing 20 vol. % or more of diamond or cubic boron nitride is brazed to the tool substrate through a brazing filler as a bonding layer in vacuum or in an inert gas atmosphere.

14. A method of manufacturing the tool claimed in claim 1, wherein the hard sintered body containing 20 vol. % or more of diamond or cubic boron nitride is brazed to a tool substrate using the brazing filler containing Ag, In, Li, Mn, Zn, Cu, Ti and Zr in a high vacuum to form a bonding layer consisting essentially of Cu, Ti and Zr, whereby bonding said hard sintered body to said tool substrate through said bonding layer.

15. A method of manufacturing the tool claimed in claim 1 wherein the hard sintered body containing 20 vol. % or more of diamond or cubic boron nitride is brazed to a tool substrate using a brazing filler containing Ag, In, Li, Mn, Zn, Cu, Ti, Zr and Ni in a high vacuum to form a bonding layer consisting essentially of Cu, Ti, Zr and Ni, whereby bonding said hard sintered body to said tool substrate through said bonding layer.

16. A method of manufacturing the hard sintered body tool as claimed in claim 1, wherein the tool substrate comprises a corner, said method comprising the steps of providing each of two ridges of the tool substrate on both sides of said corner with a first ridge adjacent said hard sintered body, and a second ridge provided nearer to an inscribing circle of the tool than is said first ridge, bonding said hard sintered body to said corner of said tool substrate, and simultaneously grinding the ridges of said hard sintered body and said first ridges to form cutting edges on said hard sintered body.

* * * * *